United States Patent
Lee et al.

(10) Patent No.: US 10,025,613 B2
(45) Date of Patent: Jul. 17, 2018

(54) UNIVERSAL VNFM AND METHOD FOR MANAGING VNF

(71) Applicant: Electronics and Telecommunications Research Institute, Daejeon (KR)

(72) Inventors: Byung-Yun Lee, Daejeon (KR); Bhum-Cheol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 129 days.

(21) Appl. No.: 15/175,783

(22) Filed: Jun. 7, 2016

(65) Prior Publication Data
US 2017/0068559 A1    Mar. 9, 2017

(30) Foreign Application Priority Data

Sep. 9, 2015 (KR) .................. 10-2015-0127689

(51) Int. Cl.
G06F 9/46 (2006.01)
G06F 9/455 (2018.01)
(52) U.S. Cl.
CPC .............. *G06F 9/45558* (2013.01); *G06F 2009/45591* (2013.01); *G06F 2009/45595* (2013.01)
(58) Field of Classification Search
None
See application file for complete search history.

(56) References Cited

U.S. PATENT DOCUMENTS

| | | | |
|---|---|---|---|
| 2014/0201738 A1 | 7/2014 | Choi et al. | |
| 2014/0376555 A1 | 12/2014 | Choi et al. | |
| 2016/0105332 A1* | 4/2016 | Xiang | H04L 41/5045 709/226 |
| 2016/0226663 A1* | 8/2016 | Jones | H04L 9/14 |

FOREIGN PATENT DOCUMENTS

| | | |
|---|---|---|
| KR | 10-2003-0000894 A | 1/2003 |
| KR | 10-2014-0091470 A | 7/2014 |
| KR | 10-2015-0000420 A | 1/2015 |

OTHER PUBLICATIONS

Network Functions Virtualisation (NFV); Management and Orchestration; ETSI GSNFV-MAN 001 V1.1.1, Dec. 2014, 184 pages.

* cited by examiner

*Primary Examiner* — Wissam Rashid
(74) *Attorney, Agent, or Firm* — Nelson Mullins Riley & Scarborough LLP

(57) ABSTRACT

A universal virtual network function manager (VNFM) in accordance with an embodiment of the present invention includes: an orchestrator-linked interface block configured to receive a command for a virtual network function (VNF) management from a network function virtualization orchestrator (NFVO) and to analyze the command; and a VNF management block configured to manage a plurality of VNFs, each produced by a different vendor, according to the command.

13 Claims, 6 Drawing Sheets

| VNF Vendor | Name | VNFD Info |
|---|---|---|
| Vendor-1 | vNAT | • Monitoring-param<br>• Flavor<br>• vm-spec<br>• Cpu<br>• Memory<br>• Mgmt interface spec<br>• Pkt-In interface spec<br>• Pkt-Out interface spec |
| Vendor-1 | .vFW | • Monitoring-param<br>• Flavor<br>• vm-spec<br>• Cpu<br>• Memory<br>• Mgmt interface spec<br>• Pkt-In interface spec<br>• Pkt-Out interface spec |

| VNF Type | VNFD Info | VNF Vendor | Monitoring Parameter |
|---|---|---|---|
| vNAT | • Monitoring-param<br>• Flavor<br>• vm-spec<br>• Cpu<br>• Memory<br>• Mgmt interface spec<br>• Pkt-In interface spec<br>• Pkt-Out interface spec | Vendor-1 | -Number of subscriber<br>-Flows per second |
| .vNAT | • Monitoring-param<br>• Flavor<br>• vm-spec<br>• Cpu<br>• Memory<br>• Mgmt interface spec<br>• Pkt-In interface spec<br>• Pkt-Out interface spec | Vendor-2 | -Number of subscriber<br>-Flows per second |

| NSID | Vendor | Monitoring-param | Flavor | Member VNF | Applicable VNF |
|---|---|---|---|---|---|
| 1 | A | # of session | Assurance-param | vNAT, vFW, vVideoCahe | |
| 2 | | | | | |

FIG. 6A

| VNF Vendor | Name | VNFD Info |
|---|---|---|
| Vendor-1 | vNAT | • Monitoring-param<br>• Flavor<br>• vm-spec<br>• Cpu<br>• Memory<br>• Mgmt interface spec<br>• Pkt-In interface spec<br>• Pkt-Out interface spec |
| Vendor-1 | .vFW | • Monitoring-param<br>• Flavor<br>• vm-spec<br>• Cpu<br>• Memory<br>• Mgmt interface spec<br>• Pkt-In interface spec<br>• Pkt-Out interface spec |

FIG. 6B

| VNF Type | VNFD Info | VNF Vendor | Monitoring Parameter |
|---|---|---|---|
| vNAT | • Monitoring-param<br>• Flavor<br>• vm-spec<br>• Cpu<br>• Memory<br>• Mgmt interface spec<br>• Pkt-In interface spec<br>• Pkt-Out interface spec | Vendor-1 | -Number of subscriber<br>-Flows per second |
| .vNAT | • Monitoring-param<br>• Flavor<br>• vm-spec<br>• Cpu<br>• Memory<br>• Mgmt interface spec<br>• Pkt-In interface spec<br>• Pkt-Out interface spec | Vendor-2 | -Number of subscriber<br>-Flows per second |

FIG. 7

| NS Name | Contained VNFs | Dependancy | Service Key Parameter | Vendor Name |
|---|---|---|---|---|
| Parential Service-1 | VNF-A, VNF-B, VNF-C | VNF-B → VNF-A<br>VNF-B → VNF-C | Assurance-param | ABC Company |
| Parential Service-12 | VNF-D, VNF-E, VNF-F | VNF-E → VNF-D<br>VNF-E → VNF-F | Assurance-param | ABC Company |

UNIVERSAL VNFM AND METHOD FOR MANAGING VNF

CROSS-REFERENCE TO RELATED APPLICATIONS

This application claims the benefit of Korean Patent Application No. 10-2015-0127689, filed with the Korean Intellectual Property Office on Sep. 9, 2015, the disclosure of which is incorporated herein by reference in its entirety.

BACKGROUND

1. Technical Field

The present invention relates to a structure of a universal virtual network function manager for efficiently managing a plurality of virtual network function managers and to a method for managing a virtual network function.

2. Background Art

Network Function Virtualization ("NFV" hereinafter) refers to a technology of attempting to realize a software-based network infrastructure by separating the traditional communication equipment into hardware and software and dynamically configuring and operating the software-implemented network functions as necessary in a universal cloud infrastructure environment.

Through the NFV, many telecommunication companies, who are burdened with enormous investment and maintenance costs of network infrastructure, hope to provide flexible services to users, be free from dependency on particular network equipment manufacturers, and save capital expenditure (CAPEX) and operating expenditure (OPEX) for expensive network equipment.

Accordingly, major global telecommunication companies have found ETSI (European Telecommunications Standards Institute) NFV ISG (Industry Specification Group), which are engaged in animated discussions on requirements for NFV, framework structures, use cases and concept verification.

FIG. 1 illustrates an NFV structure provided by ETSI.

Referring to FIG. 1, the NFV structure is constituted with NFVI (NFV Infrastructure), VNF (Virtual Network Function) and MANO (Management and Orchestration).

The VNF performs a role of implementing a network function using the NFVI.

The MANO performs a role of managing virtual resources (e.g., computing resource, network resource and storage resource) and orchestrating the virtual resources.

The NFVI, which is an environment in which the VNF can be implemented, is constituted with hardware and software. Specifically, the NFVI is divided into a compute domain, a hypervisor domain and an infrastructure domain. The compute domain refers to physical hardware resources, such as compute hardware and storage hardware. The hypervisor domain refers to virtual resources, such as virtual compute and virtual storage, assigned to a virtual machine based on the physical hardware resources. Moreover, the hypervisor domain includes virtualization layers, for which an operating system such as KVM or XEN may be used. The infrastructure network domain includes a virtual network, which refers to a network assigned to a virtual machine.

With the structure of a virtual network function manager ("VNFM" hereinafter) suggested by ETSI NFV ISG, VNF and VNFM complying with a standard interface may be processed, but it is not possible to process an actually-realized specific interface of VNF. Moreover, while the current structure of VNFM can simply perform primary management of various kinds of VNFs, the actual operating conditions require that the VNFs be managed discretely according to the types, manufacturers or correlations of the VNFs.

SUMMARY

The present invention provides a structure for a universal VNFM that can manage various kinds of VNFs and a method for managing a VNF having a specific interface.

A universal virtual network function manager (VNFM) in accordance with an embodiment of the present invention includes: an orchestrator-linked interface block configured to receive a command for a virtual network function (VNF) management from a network function virtualization orchestrator (NFVO) and to analyze the command; and a VNF management block configured to manage a plurality of VNFs, each produced by a different vendor, according to the command.

The VNF management block may include a VNF command management part configured to extract an interface corresponding to the VNF and, if the extracted interface matches with an interface of a generic VNFM provided by ESTI standard, register the interface in the VNF management block and process a generic management command.

If the extracted interface does not match with the interface of the generic VNFM provided by the ETSI standard, the VNF command management part may register the interface in the VNF management block and install a plug-in for processing a specific management command.

If the VNF is provided without containing a VNFM, the VNF management block may further include a VNF management part configured, if a vendor of the VNF exists in a VNF management table, to input a name and information of the VNF in the VNF management table and, if the vendor of the VNF does not exist in the VNF management table, to create a new vendor of VNF and input a name and information of the VNF in the VNF management table.

The VNF management block may further include a VNF performance/disorder management part configured to input VNFD information, vendor name and monitoring parameter information of the VNF if a type of the VNF exists in the VNF management table and if the type of the VNF does not exist in the VNF management table, add a new VNF type and input VNFD information, vendor name and monitoring parameter information of the VNF in the VNF management table.

The VNF management block may further include: a VNF instance part configured to instantiate the VNF and manage a lifecycle for a generated VNF instance; and a VNF correlation management part configured to manage a VNF correlation table including parameters of a network service provided with correlations among VNFs and a combination of VNFs.

The VNF management block may further include a network service management table including an ID of a network service, a VNF type for the network service and monitoring parameters for performance management of the network service.

The VNF management table may be arranged according to types or vendors.

A method for managing a virtual network function (VNF) in accordance with an embodiment of the present invention includes: allowing a universal virtual network function manager (VNFM) to be provided with a VNF; determining whether the VNF contains a VNFM; extracting an interface of the VNFM if the VNF contains the VNFM; and if the extracted interface matches with an interface of a generic VNFM provided by ETSI standard, registering the interface in a VNF management block and processing a generic management command.

The method may further include: if the extracted interface does not match with the interface of the generic VNFM provided by the ETSI standard, registering the interface in the VNF management block; and installing a plug-in for processing a specific management command.

The method may further include: if the VNF does not contain a VNFM, extracting an Or-VNFM interface from a VNF descriptor (VNFD) and a VNF package of the VNF; and if the extracted interface matches with the interface of the generic VNFM provided by the ETSI standard, registering the interface in the VNF management block and processing a generic management command.

The method may further include: if the extracted interface does not match with the interface of the generic VNFM provided by the ETSI standard, registering the interface in the VNF management block; and installing a plug-in for processing a specific management command.

The method may further include: if a vendor of the VNF exists in a VNF management table, inputting a name and information of the VNF in the VNF management table; and if the vendor of the VNF does not exist in the VNF management table, creating a new vendor of VNF and inputting a name and information of the VNF in the VNF management table.

The method may further include: if a type of the VNF exists in the VNF management table, inputting VNFD information, vendor name and monitoring parameter information of the VNF; and if the type of the VNF does not exist in the VNF management table, creating a new VNF type and inputting VNFD information, vendor name and monitoring parameter information of the VNF in the VNF management table.

The VNF management block may include a network service management table including an ID of a network service, a VNF type for the network service and monitoring parameters for performance management of the network service.

The VNF management table may be arranged according to types or vendors.

According to an embodiment of the present invention, it is possible to process not only a VNF and a VNFM complying with a standard interface but also a specific interface of the VNF in the structure of VNFM for managing a function of a virtual network.

Moreover, according to an embodiment of the present invention, it is possible to enhance the efficiency of VNF management by separately managing various types of VNFs according to their types and manufacturers and by managing correlation information of VNFs in a table.

BRIEF DESCRIPTION OF DRAWINGS

FIG. 6A and FIG. 6B illustrate a VNF management table in accordance with an embodiment of the present invention.

FIG. 7 illustrates a VNF correlation table in accordance with an embodiment of the present invention.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain relevant conventional technology is determined to evade the point of the present invention, the pertinent detailed description will be omitted.

Unless clearly used otherwise, expressions in a singular form shall be generally interpreted to mean "one or more."

Figure 1:
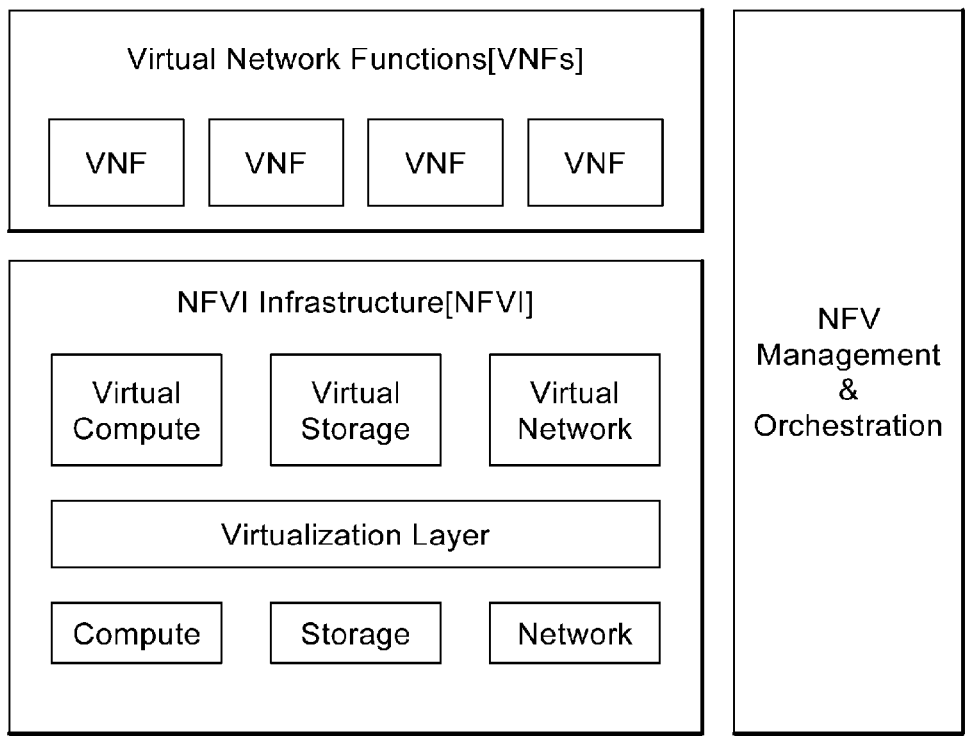
FIG. 1 illustrates an NFV structure provided by ETSI.
Figure 2A:
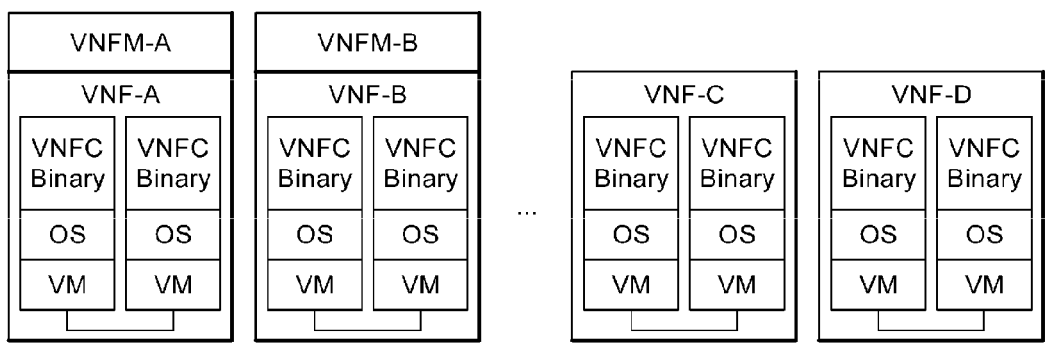
FIG. 2A and FIG. 2B illustrate a universal VNFM supporting a plurality of VNFMs in accordance with an embodiment of the present invention.
Figure 2B:
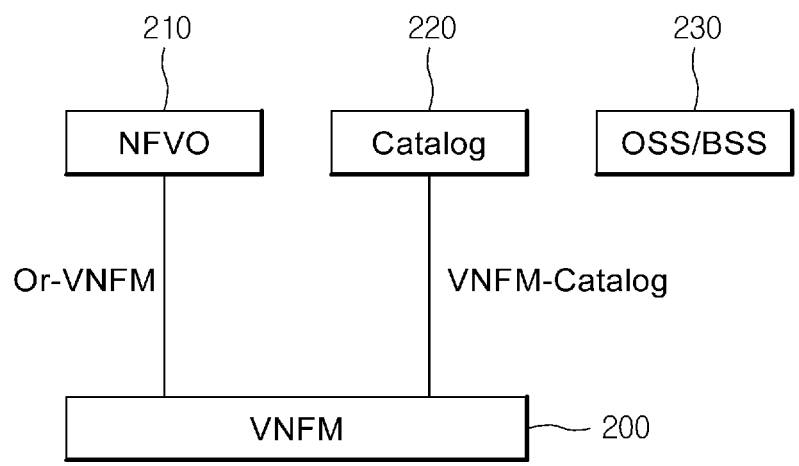

FIG. 2A and FIG. 2B illustrate a universal VNFM supporting a plurality of VNFMs in accordance with an embodiment of the present invention.

Referring to FIG. 2A, a developer named "A" has developed a virtual network function, named "VNF-A." The developer A may develop VNFM-A and EM (Element Management) corresponding to the VNFM-A. The EM performs FCAPS (Fault, Configuration, Accounting, Performance, Security) functions for management of a VNF. Moreover, a developer named "B" has developed a virtual network function, named "VNF-B" and can develop VNFM-B and EM corresponding to VNF-B. Similarly, various developers may develop VNF as well as VNFM and EM corresponding to the developed VNF. Yet, it is also possible that some developers may simply develop and provide a single VNF, without developing a corresponding VNFM.

The developed VNF and VNFM are provided in the form of a VNF packaging, which may cause a problem of dependency on a vendor (or developer, producer, etc.). The VNF packaging assigns physical resources required for having a VNF product distributed and managed. Accordingly, the VNF packaging should be able to provide a VNF that meets the requirement for providing appropriate capacity and resources to a user.

Referring FIG. 2B, an NFV environment including a universal VNFM is illustrated.

VNFM 200 shares information with a NFV Orchestrator ("NFVO" hereinafter) 210 and a catalog 220 and manages the VNF. Moreover, the VNFM 200 receives an instruction for VNFM management from the NFVO 210 through an Or-FNFM standard interface.

The NFVO 210 manages and transfers virtual resources, and provides a VNF lifecycle management function. Moreover, the NFVO 210 manages instances of VNFs through cooperation with the VNFM 200.

The catalog 220 stores information to be shared by the VNFM 200 and the NFVO 210. The catalog 220 manages Network Service Catalog, VNF Catalog, NFV Instances Repository and NFVI Resources Repository.

The Network Service Catalog refers to a basic template required for managing information about every network service performed through the VNF. The Network Service Catalog includes Network Service Descriptor information, Virtual Link Descriptor information and VNF Forwarding Graph Descriptor information.

The VNF Catalog refers to a basic template for managing information about every VNF packaging performed. The VNF Catalog includes VNF Descriptor information, Software Images information and application program package (e.g., manifest files) information. The VNFM 200 and NFVO 210 may inquire of the VNF Catalog about searching VNFD (VNF Descriptor) for validity or availability of instantiation.

The NFV Instances Repository includes information about every VNF instance and network service instance. VNF instances and network services instances are each expressed as VNF Record and Network Service Record. Each record reflects the state of lifecycle of each instance.

The NFVI Instances Repository includes information about NFVI resources. That is, the NFVI Instances Repository includes information required for reserving, assigning and monitoring resources.

OSS/BSS 230 is a system that carries out operation/business functions of a telecommunication company or operator. Moreover, the OSS/BSS 230 handles management and orchestration of an existing system and provides end-to-end information about an existing network.

Figure 3:
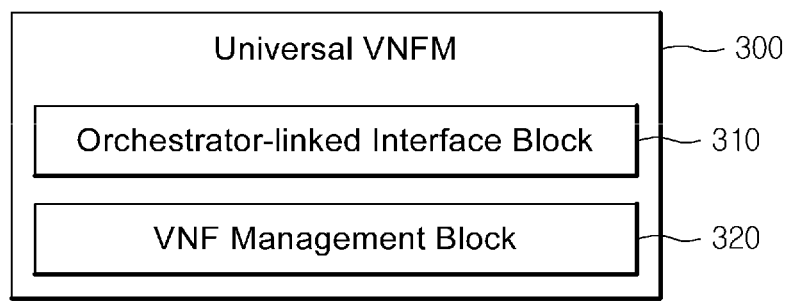
FIG. 3 illustrates the structure of a universal VNFM in accordance with an embodiment of the present invention.

FIG. 3 illustrates the structure of a universal VNFM in accordance with an embodiment of the present invention.

A VNF vendor may provide a VNFM for a particular VNF and a generic interface complying with the ETSI standard and may additionally provide an interface for processing vendor-specific functions. Although the VNFM developed by each vendor may provide an interface for its corresponding VNF, correlation or co-operation between VNFs of different models is not taken into consideration. Therefore, VNFMs developed by various vendors cannot provide a global view for VNFs carried out by their corresponding management domains. Moreover, since mismatch may be occurred for FCAPS, which are basic management functions for management of VNFs of various models, it is necessary to manage and process specific VNF commands for independent functions that each VNF has.

That is, although each VNF vendor can provide an internally-developed interface, it is not possible for each VNF vendor to provide an efficient structure for VNF service providers in terms of VNF management and operation due to mismatch of interface for VNFs of various models. When a new network service is provided to customers, the VNF service providers need to have the performance and stability of the network service enhanced and facilitate an efficient linkage, by categorizing and managing the VNFs for each VNF vendor.

For this, the universal VNFM 300 in accordance with an embodiment of the present invention includes an orchestrator-linked interface block 310 and a VNF management block 320.

The universal VNFM 300 analyzes a command delivered through the Or-VNFM standard interface by use of the orchestrator-linked interface block 310. The universal VNFM 300 transfers the analyzed command to the VNF management block 320.

The orchestrator-linked interface block 310 provides a linked interface between the NFVO and the VNFM 300. The orchestrator-linked interface block 310 executes the functions of authentication, reservation and release of resources existing within the NFVI for VNF, inquiry about instantiating VNF, change of VNF instance and inquiry about VNF package.

The VNF management block 320 executes the functions of instantiating VNF, lifecycle management of VNF instance, VNF management per vendor, management of correlation among VNFs, management of performance/disorder of VNF and management of VNF according to a command. The VNF management block 320 will be described in more detail with reference to FIG. 4.

Figures 4, 5:
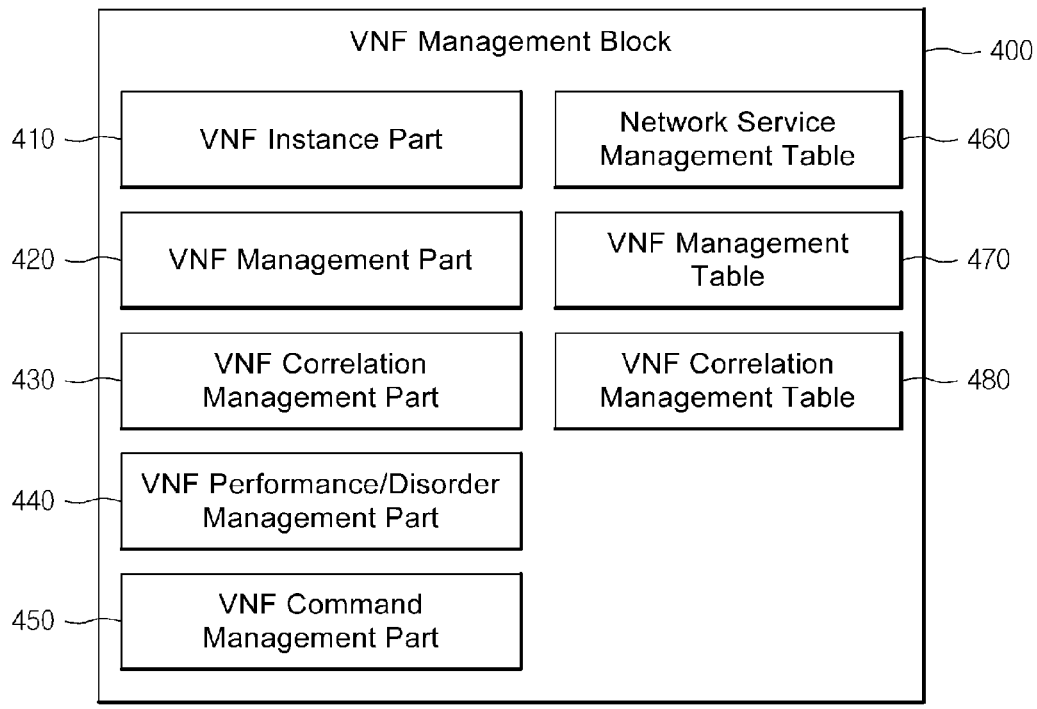
FIG. 4 illustrates a VNF management block in accordance with an embodiment of the present invention.
FIG. 5 illustrates a network service management table in accordance with an embodiment of the present invention.

FIG. 4 illustrates a VNF management block in accordance with an embodiment of the present invention.

Referring to FIG. 4, a VNF management block 400 includes a VNF instance part 410, a VNF management part 420, a VNF correlation management part 430, a VNF performance/disorder management part 440 and a VNF command management part 450.

The VNF instance part 410 instantiates the VNF and manages the lifecycle for the generated VNF instance.

The VNF management part 420 manages the VNF developed for each VNF vendor to enhance the performance and stability of service and facilitate an efficient link. For this, the VNF management part 420 manages a network service management table 460 and a VNF management table 470. The network service management table 460 will be described in detail with reference to FIG. 5, and the VNF management table 470 will be described in detail with reference to FIG. 6A and FIG. 6B.

Moreover, in the case where the VNF is provided without including a VNFM, the VNF management part 420 inputs the name and information of the VNF in the VNF management table 470 if the VNF vendor exists in the VNF management table 470. If the VNF vendor does not exist in the VNF management table 470, the VNF management part 420 may create a new VNF vendor and input the name and information of a VNF in the VNF management table 470.

The VNF correlation management part 430 manages a VNF correlation table 480, which includes parameters of a network service provided with correlations among VNFs and a combination of VNFs. The VNF correlation management part 430 may make reference to the VNF correlation table 480 when a new network service is provided later. The VNF correlation table 480 will be described in detail with reference to FIG. 7.

The VNF performance/disorder management part 440 manages monitoring parameters defined in the VNFD. Moreover, the VNF performance/disorder management part 440 inputs the VNFD information, vendor name and monitoring parameter information of the VNF if the type of the VNF exists in the VNF management table 470. If the type of the VNF does not exist in the VNF management table 470, the VNF performance/disorder management part 440 may create a new VNF type and input the VNFD information, vendor name and monitoring parameter information of the VNF in the VNF management table 470.

If the VNF of any vendor is not capable of providing a generic interface complying with the ETSI standard, the VNF command management part 450 may register the vendor-specific interface to process a management command. Specifically, the VNF command management part 450 extracts an interface corresponding to the VNF. If the extracted interface matches with an interface of a generic VNFM provided by the ETSI standard, the interface may be registered in the VNF management block 400, and a generic management command may be processed. If the extracted interface does not match with an interface of a generic VNFM provided by the ETSI standard, the interface is registered in the VNF management block 400, and a plug-in for processing a specific management command is installed. Then, it is possible for the VNF command management part 450 to process the specific management command. Here, the plug-in may be provided by the VNF vendor or provided by the VNF command management part 450.

FIG. 5 illustrates a network service management table in accordance with an embodiment of the present invention.

Referring to FIG. 5, the network service management table includes network service ID, VNF vendor for network service, monitoring parameter for performance management of the network service and other network service information. Moreover, the network service management table is managed by the VNF management block.

The network service ID refers to Network Service Descriptor.

Monitoring parameter refers to a list of parameters that need to be monitored when the network is executed. For example, if the monitoring parameter is "# of session," it means that the number of sessions accessed to the network service needs to be monitored.

그 외에 네트워크 서비스의 정보로는 플레이버 (Flavor), 멤버 VNF (Member VNF), 적용 가능 VNF 등을 포함할 수 있다.

Other network service information may include flavor, member VNF and applicable VNF.

Flavor, which indicates a key performance index (KPI) of the network service, is a parameter for having proper virtual resources assigned when the network service is distributed.

The member VNF refers to the VNF of an identical vendor required for configuring the network service.

FIG. 6A and FIG. 6B illustrate a VNF management table in accordance with an embodiment of the present invention.

The VNF management table includes VNF vendor names, VNF names, VNF types and VNFD information. The VNFD information includes detailed information on VNF (e.g., Monitoring-param, Flavor, vm-spec, Cpu, Memory, Mgmt interface spec, Pkt-In interface spec, Pkt-out interface spec, etc.). The VNF management table is managed by the VNF management block.

Moreover, the VNF management table may be arranged according to the types or vendors. The VNF management table shown in FIG. 6A has the VNFs arranged according to the vendors, and the VNF management table shown in FIG. 6B has the VNFs arrange according to the types.

FIG. 7 illustrates a VNF correlation table in accordance with an embodiment of the present invention.

Referring to FIG. 7, the VNF correlation table includes network service names, VNFs contained in the network service, dependency between VNFs, service key parameters and vendor names. The service key parameter refers to key performance indicators to be provided by the network service. Moreover, the VNF correlation table is managed by the VNF correlation management part.

Figure 8:
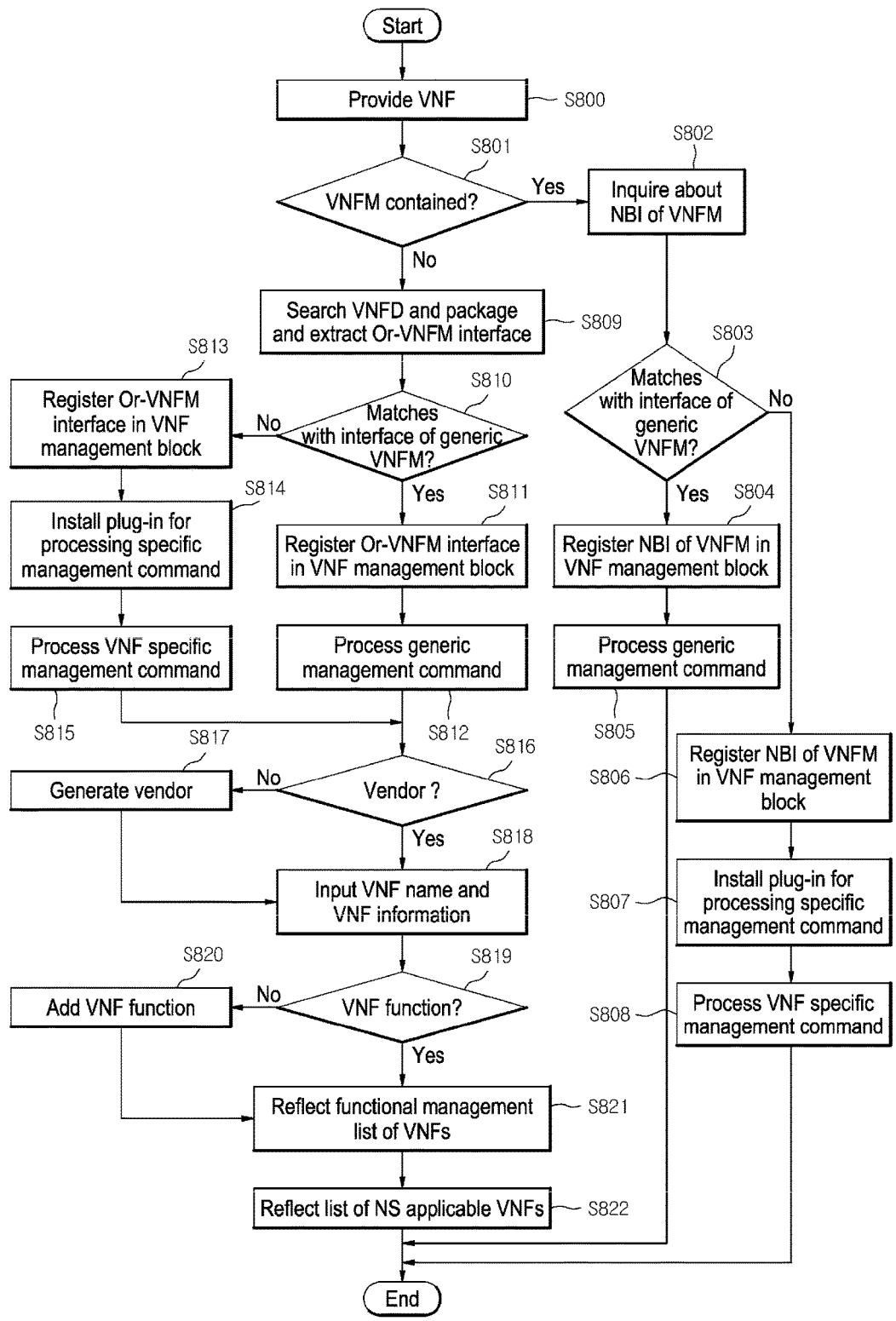
FIG. 8 illustrates a method of managing a VNF in accordance with an embodiment of the present invention.

FIG. 8 illustrates a method of managing a VNF in accordance with an embodiment of the present invention.

Referring to FIG. 8, in step S800, a universal VNFM is provided with a VNF.

In step S801, a VNF management block determines whether the provided VNF contains a VNFM.

In step S802, in the case where the provided VNF contains the VNFM, the VNF management block extracts a north bound interface (NBI) of the VNFM. The NBI may be extracted from a VNF packaging provided together with the VNF.

In step S803, the VNF management block determines whether the extracted NBI matches with an interface of a generic VNFM provided by the ETSI standard.

In step S804, if the extracted NBI matches with the interface of a generic VNFM, the pertinent NBI is registered in the VNF management block.

In step S805, a VNF management part may process a generic management command for the provided VNF.

In step S806, if the extracted NVI and the interface of a generic VNFM do not match with each other, the pertinent NBI is registered in the VNF management block.

In step S807, since the extracted NBI is different from the generic interface, a plug-in is installed in order to process a specific management command for the VNF. Here, the plug-in may be provided by a VNF vendor or provided by the VNF command management part.

In step S808, the VNF management part may process the specific management command for the provided VNF.

In the case where the provided VNF does not contain the VNFM, in step S809, the VNF management block searches VNFD and VNF packaging of the VNF to extract an Or-VNFM interface.

In step S810, the VNF management block determined whether the extracted Or-VNFM interface matches with the interface of a generic VNFM provided by the ETSI standard.

In the case where the extracted Or-VNFM interface and the interface of a generic VNFM match with each other, in step S811, the pertinent Or-VNFM is registered in the VNF management block.

In step S812, the VNF management part may process a generic management command for the provided VNF.

In step S813, if the extracted Or-VNFM interface and the interface of a generic VNFM do not match with each other, the pertinent Or-VNFM is registered in the VNF management block.

In step S814, since the extracted Or-VNFM is different from the generic interface, a plug-in is installed in order to process a specific management command for the VNF. Here, the plug-in may be provided by the VNF vendor or provided by the VNF command management part.

In step S815, the VNF management part may process the specific management command for the provided VNF.

In the case where the VNFM is not contained in the provided VNF, in step S816, the VNF management part determines whether a vendor name of the provided VNF is in a VNF management table.

If the vendor name of the VNF is not in the VNF management table, in step S817, the VNF management part adds a new VNF vendor name in the VNF management table. If the vendor name of the VNF is in the VNF management table, step S818 is carried out.

In step S818, the VNF management part inputs a VNF name and VNF information in the VNF management table according to the vendor name of the VNF.

It is described in steps S816 to S818 that the VNF management part adds the VNF name and the VNF information in the VNF management table according to the vendor name of the VNF, based on whether the vendor name of the provided VNF is present or not. Similarly, it is possible that a VNF performance/disorder management part adds VNFD information of the VNF, a vendor name of the VNF and monitoring parameter information of the VNF in the VNF management table according to the type of VNF, based on whether the type of the provided VNF is present in the VNF management table.

If no VNFM is contained in the provided VNF, in step S819, the VNF management part determines whether a function of the provided VNF is present in a network service management table.

If no function of the provided VNF is present in the network service management table, in step S820, the VNF management part adds a new function of VNF in the network service management table. If the function of the provided VNF is present in the network service management table, step S821 is carried out.

In step S821, the VNF management part reflects a functional list of VNFs in the network service management table.

In step S822, the VNF management part reflects a list of network service applicable VNFs in the network service management table.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A universal virtual network function manager (VNFM), comprising:
   an orchestrator-linked interface block configured to receive a command for a virtual network function (VNF) management from a network function virtualization orchestrator (NFVO) and to analyze the command; and
   a VNF management block configured to manage a plurality of VNFs, each produced by a different vendor, according to the command, and
   wherein the VNF management block comprises a VNF command management part configured to extract an interface corresponding to the VNF and, if the extracted interface matches with an interface of a generic VNFM, register the interface in the VNF management block and process a generic management command, and
   wherein, if the extracted interface does not match with the interface of the generic VNFM, the VNF command management part is configured to register the interface in the VNF management block and install a plug-in for processing a specific management command.

2. The universal VNFM of claim 1, wherein, if the VNF is provided without containing a VNFM, the VNF management block further comprises a VNF management part configured, if a vendor of the VNF exists in a VNF management table, to input a name and information of the VNF in the VNF management table and, if the vendor of the VNF does not exist in the VNF management table, to create a new vendor of VNF and input a name and information of the VNF in the VNF management table.

3. The universal VNFM of claim 2, wherein the VNF management block further comprises a VNF performance/disorder management part configured to input VNFD information, vendor name and monitoring parameter information of the VNF if a type of the VNF exists in the VNF management table and if the type of the VNF does not exist in the VNF management table, add a new VNF type and input VNFD information, vendor name and monitoring parameter information of the VNF in the VNF management table.

4. The universal VNFM of claim 3, wherein the VNF management block further comprises:
   a VNF instance part configured to instantiate the VNF and manage a lifecycle for a generated VNF instance; and
   a VNF correlation management part configured to manage a VNF correlation table including parameters of a network service provided with correlations among VNFs and a combination of VNFs.

5. The universal VNFM of claim 4, wherein the VNF management block further comprises a network service management table including an ID of a network service, a VNF type for the network service and monitoring parameters for performance management of the network service.

6. The universal VNFM of claim 5, wherein the VNF management table is arranged according to types or vendors.

7. A method for managing a virtual network function (VNF), comprising:
   allowing a universal virtual network function manager (VNFM) to be provided with a VNF;
   determining whether the VNF contains a VNFM;
   extracting an interface of the VNFM if the VNF contains the VNFM; and
   if the extracted interface matches with an interface of a generic VNFM, registering the interface in a VNF management block and processing a generic management command, and
   if the extracted interface does not match with the interface of the generic VNFM, registering the interface in the VNF management block and installing a plug-in for processing a specific management command.

8. The method of claim 7, further comprising:
   if the VNF does not contain a VNFM, extracting an Or-VNFM interface from a VNF descriptor (VNFD) and a VNF package of the VNF; and
   if the extracted interface matches with the interface of the generic VNFM, registering the interface in the VNF management block and processing a generic management command.

9. The method of claim 8, further comprising:
   if the extracted interface does not match with the interface of the generic VNFM, registering the interface in the VNF management block; and
   installing a plug-in for processing a specific management command.

10. The method of claim 9, further comprising:
    if a vendor of the VNF exists in a VNF management table, inputting a name and information of the VNF in the VNF management table; and
    if the vendor of the VNF does not exist in the VNF management table, creating a new vendor of VNF and inputting a name and information of the VNF in the VNF management table.

11. The method of claim 10, further comprising:
    if a type of the VNF exists in the VNF management table, inputting VNFD information, vendor name and monitoring parameter information of the VNF; and
    if the type of the VNF does not exist in the VNF management table, creating a new VNF type and inputting VNFD information, vendor name and monitoring parameter information of the VNF in the VNF management table.

12. The method of claim 11, wherein the VNF management block comprises a network service management table including an ID of a network service, a VNF type for the network service and monitoring parameters for performance management of the network service.

13. The method of claim 12, wherein the VNF management table is arranged according to types or vendors.

* * * * *